April 17, 1934.   O. U. ZERK   1,955,162
CENTRALIZED LUBRICATING SYSTEM
Filed Nov. 9, 1929   5 Sheets-Sheet 2
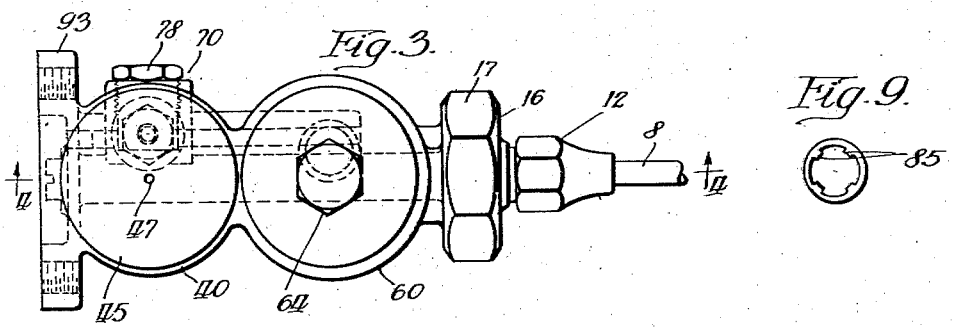
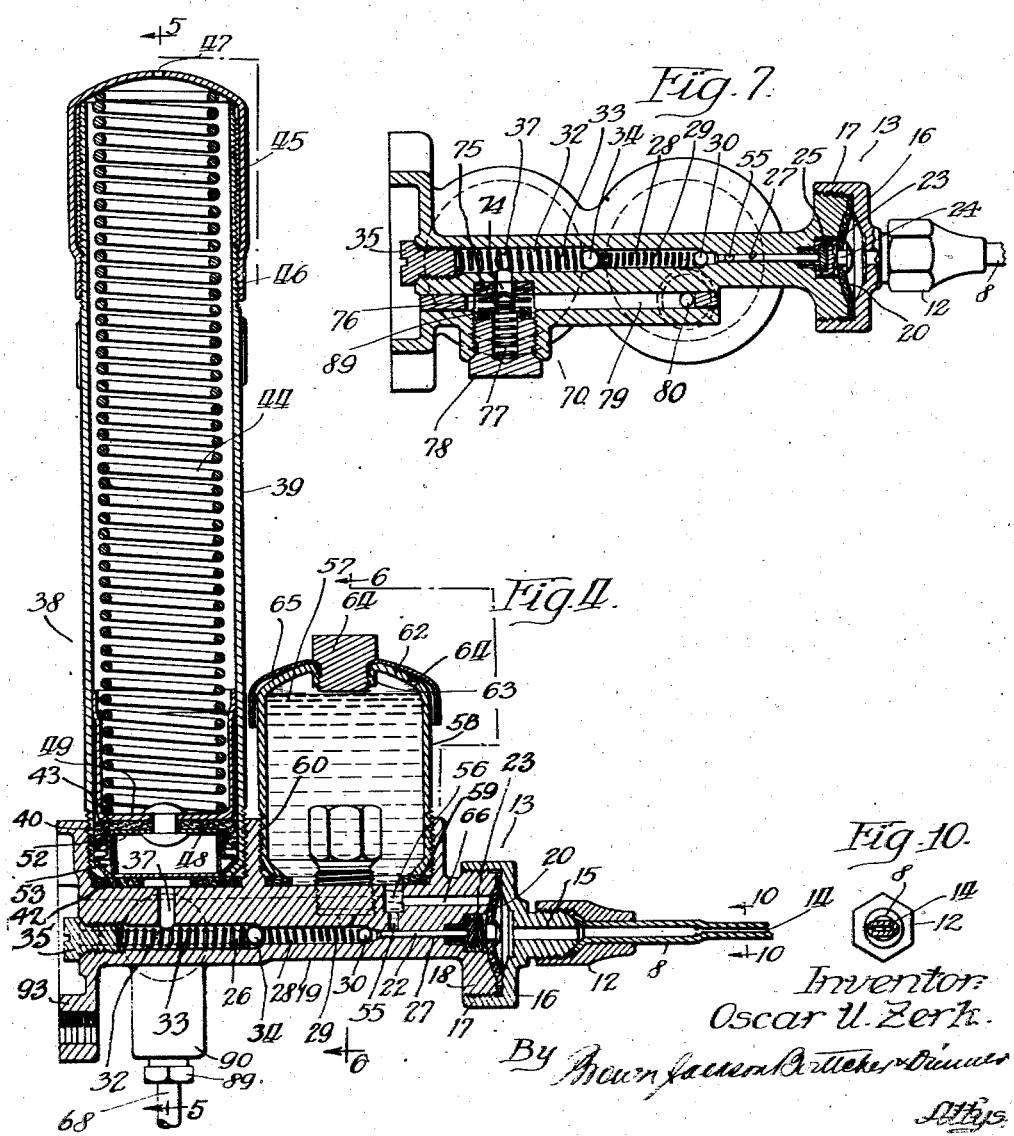
Inventor:
Oscar U. Zerk

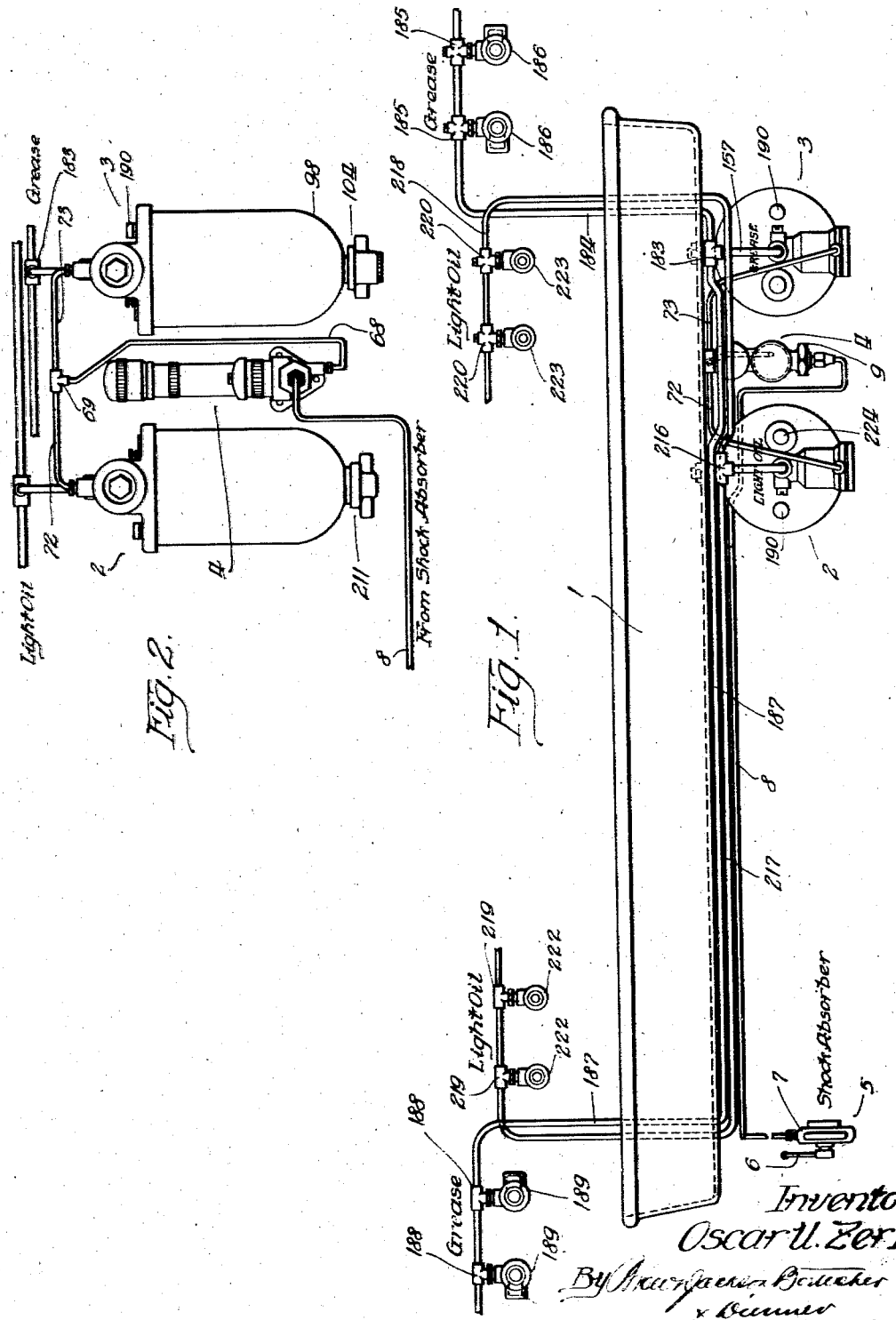

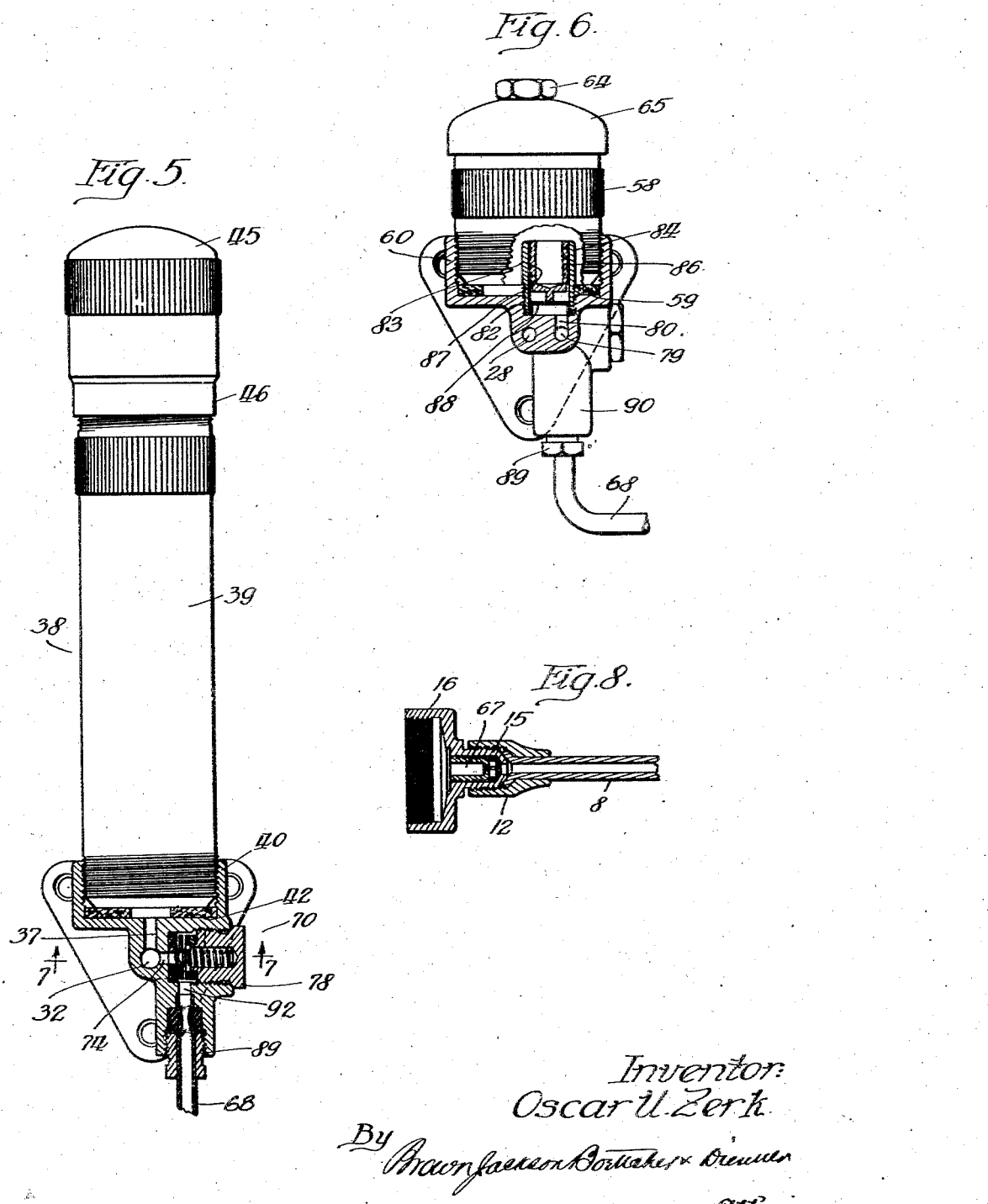

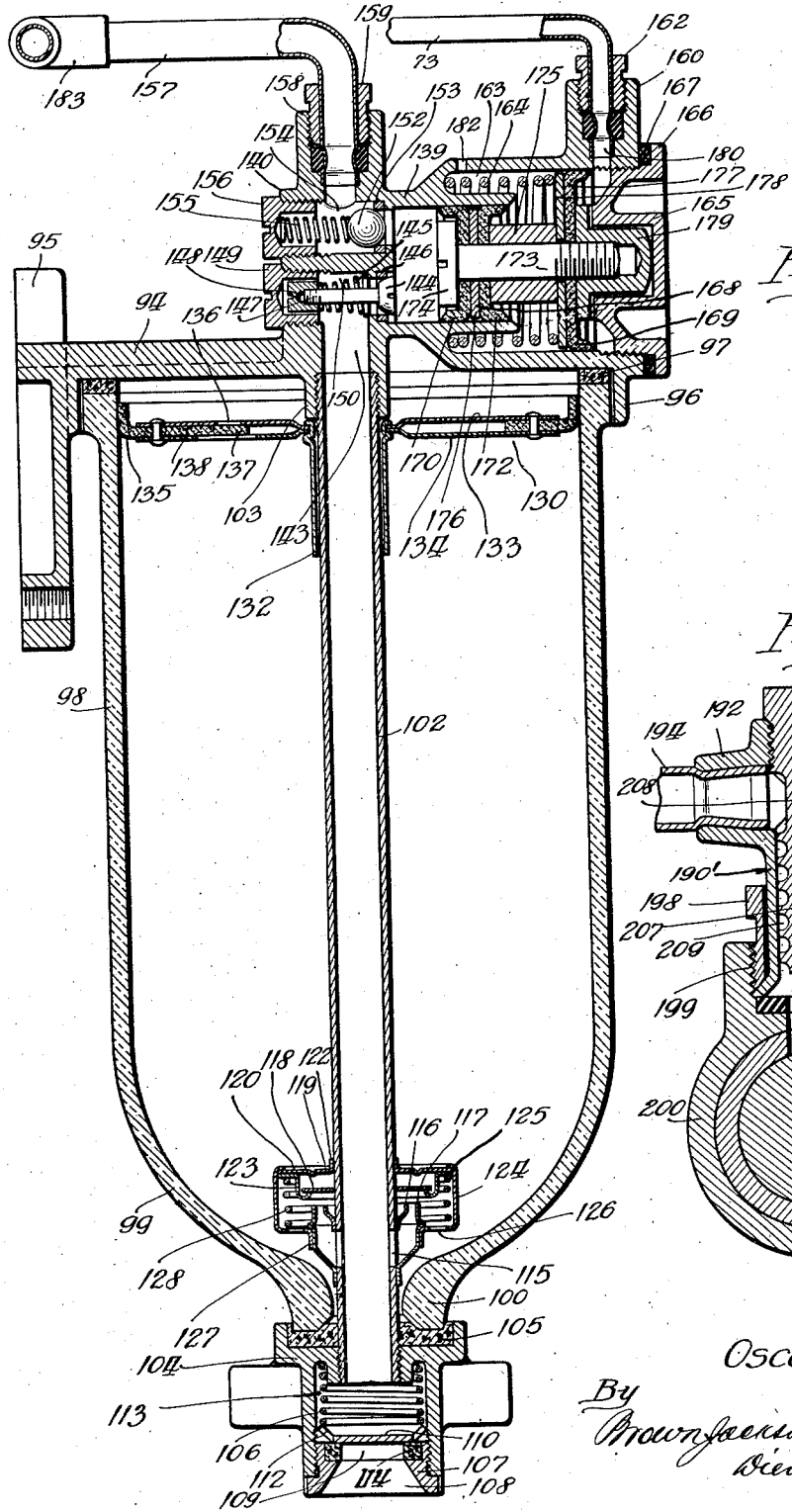

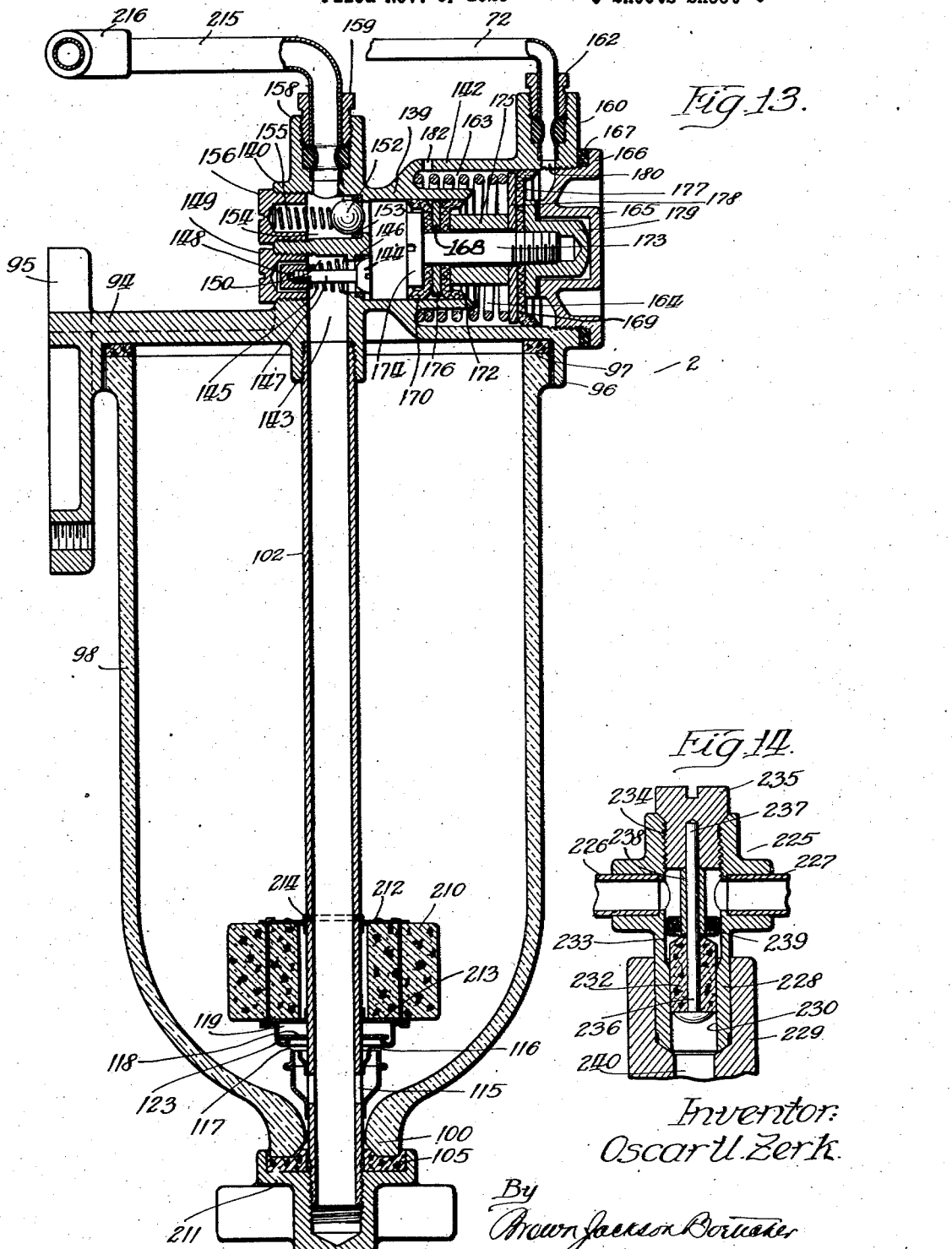

Patented Apr. 17, 1934

1,955,162

UNITED STATES PATENT OFFICE 1,955,162

CENTRALIZED LUBRICATING SYSTEM

Oscar U. Zerk, Chicago, Ill., assignor to Alemite Corporation, Chicago, Ill., a corporation of Delaware Application November 9, 1929, Serial No. 406,115

26 Claims. (Cl. 184—7)

My invention relates to centralized lubrication and while it is particularly applicable to automotive work, more particularly to the lubrication of the chassis of vehicles, such as automobiles, tractors, gun carriages, war tanks, locomotives, aeroplanes and the like, it is also adaptable to industrial lubrication, that is to the lubrication of stationary machines, such as stamping presses, printing presses, textile machinery, shafting and the various types of machines and machine tools employed in modern industry.

While the present system constitutes in general an improvement upon the system disclosed in my copending applications, Serial No. 394,363 and Serial No. 397,337, it constitutes also an improvement in motion reducing mechanism independent of the particular service to which the power-operated, stroke-producing device is put and it constitutes also improvements in details in certain operating units which are useful in the above relation.

In the above systems, I have disclosed centralized lubricating systems, either of the simplex or multiplex type for distributing one or a plurality of kinds of lubricant to the bearings of an automobile or the like, and employ as a suitable means for securing the intermittent action of the lubricant dispensing pump a power supply system involving a small fluid pressure pump actuated either continuously or intermittently, a relatively large number of times to accumulate a body of motive fluid, in that case air, which body of motive fluid when accumulated by a large number of motions of the fluid pressure pump is then caused to act upon the lubricant dispensing pump to perform a lubricating operation. The body of fluid pressure may be applied to more than one lubricating pump and as disclosed in the second aforesaid application, the body of compressed air may be employed to move either a mechanical piston or a hydraulic piston, or may be used in any other desired manner for securing the periodic action of distributing lubricant to the various bearings of the machine to be lubricated.

In both of the aforesaid applications, I have shown an air pump and an air accumulating reservoir for accumulating a charge of compressed air which, upon reaching a predetermined pressure, is applied to the work of dispensing and distributing the lubricant. A small capacity compressor presents greater difficulty in construction and in operation than does a small capacity hydraulic pump of the same displacement, or of an equivalent displacement for securing a body of liquid under pressure.

That is to say, I find that it is easier to reduce a large number of strokes to a single stroke where a hydraulic medium is employed between the parts, than where a gas or compressible fluid pressure medium is employed between the parts.

According to the present invention, I provide a closed hydraulic system between the small frequently operated pump and the accumulator and the motor element operated by fluid pressure from the accumulator. This obviates the necessity for a filter or screen on the intake side of the pressure generating pump and also prevents any possibility of the entry of moisture which might freeze within a pneumatic system. Also, it is known to be much easier to hold under pressure a body of liquid than it is to hold under pressure a body of gas.

The chief object of the present invention is to provide in a centralized lubricating system of the type disclosed in my aforesaid copending applications, a hydraulic motion translating leakage. This involves a small hydraulic pump which can operate more accurately than can a pneumatic pump because of the incompressible character of the medium.

Another object is to provide in such a system a completely enclosed pressure fluid linkage between the source of power and the device to be actuated. This avoids any contamination from the surrounding medium, such as dust, grit or moisture and the like.

Also, by the use of the hydraulic (oil) system, pressure may be more readily retained, either during an active period or during an inactive period of the system.

Another object of the invention is to provide an automatic lubricating system in which a hydraulic fluid pressure connection is employed between the source of power and one or more of the pump mechanisms which distribute lubricant to the bearings.

A further object of the invention is to provide a lubricating system in which a pump for heavy lubricant is periodically operated by a pressure system in which the pressure generating pump is of small capacity and may be continuously acting upon a body of lighter lubricant or other hydraulic medium.

A further object of the invention is to provide an improved power supply system for performing desired action at relatively long periods from a source of power acting continuously or at frequent intervals through a hydraulic pressure accumulating system.

A further object of the invention is to reduce a relatively large number of actions or motions to a single motion in a positive, but readily controllable manner.

A further object of the invention is to provide a motion reducing system comprising a small hydraulic pump which may be operated continuously or intermittently to accumulate over a relatively long period a body of liquid under pressure, with means for applying the accumulated body to a fluid pressure motor for performing a desired action at relatively measured intervals as for example to operate a lubricant dispensing pump at periods corresponding to a predetermined amount of road travel.

It is a further object of the invention to provide a motion reducing system of the hydraulic type applicable to a centralized lubricating system, or the like, for reducing a predetermined number of road travel motions to a single lubricating action or other desired periodic action.

Other and further objects will become apparent from the following detailed description, drawings and claims.

When a hydraulic medium is employed, the pressure accumulating pump may have an effective stroke as small as one twenty-fifth part of a drop and it can be made to successfully pump oil under pressure into an accumulating chamber, from which the oil under pressure may be applied to the work of performing a lubricating operation. It is much easier to pump small volumes of liquid in this manner than it is to pump small volumes of air, since air is an elastic fluid and must be compressed to delivery pressure before any air is forced past the delivery check valve.

Also, because of the lubricating character of the hydraulic medium, the wear upon the small pump is greatly reduced or practically eliminated.

Now in order to acquaint those skilled in the art with the manner of constructing and operating a device embodying my invention, I shall describe in connection with the accompanying drawings a specific embodiment of my invention.

In the drawings, in which like reference numerals indicate the like parts throughout:

Figure 1 is a diagrammatic top plan view of a system embodying my invention;

Figure 2 is a partial front elevational view of the same showing the lubricant reservoirs with their distributing pumps and the accumulating reservoir with its charging pump;

Figure 3 is a top plan view of the charging pump and reservoir unit;

Figure 4 is a vertical longitudinal section through the charging pump and reservoir unit, taken on the line 4—4 of Figure 3;

Figure 5 is a vertical cross-sectional view taken on the line 5—5 of Figure 4;

Figure 6 is a partial section taken on the line 6—6 of Figure 4;

Figure 7 is a horizontal section taken on the line 7—7 of Figure 5;

Figure 8 is a fragmentary section through a modified form of diaphragm chamber;

Figure 9 is a top plan view of the resistance plug element providing the return of leakage from the pressure delivery line leading to the lubricating pump operating motor for permitting the leakage of pressure fluid back into the oil reservoir of the accumulator unit;

Figure 10 is a fragmentary cross-sectional view of the tube and coupling between the shock absorber and the charging pump chamber taken on the line 10—10 of Fig. 4;

Figure 11 is a vertical longitudinal section through the grease reservoir and pump unit;

Figure 12 is a vertical longitudinal section through a resistance unit for grease;

Figure 13 a vertical longitudinal section through an oil reservoir and pump unit; and Figure 14 is a vertical longitudinal section through a resistance unit for oil.

Referring first to Figures 1 and 2, I have shown my system as applied to an automobile of which the dashboard is shown at 1. The light oil reservoir unit 2 and the grease reservoir unit 3 are shown as mounted upon the front part of the dashboard of the vehicle.

Between them is mounted the accumulator and charging pump unit 4.

The unit 4 is connected to the shock absorber 5. The shock absorber 5 is of the hydraulic type having an operating arm 6 which is adapted to be secured through a suitable connection to the axle and it has a liquid containing member 7 which is adapted to be secured to the frame, as for example disclosed in Figure 1 of my prior application, Serial No. 394,363. The particular type of hydraulic shock absorber is not of the essence of the invention, however, the essential feature is that a body of liquid which is contained in the chamber of the shock absorber and communicates through a pipe 8 with the charging pump 9 of the unit 4, is subjected to variations of pressure caused by movement of the automobile over the road.

The pipe 8 is connected by a coupling 12 to the motor member 13 of the charging pump. This pipe 8 may be flattened as shown at 14 in Figures 4 and 10 to offer a flow restriction so that minor changes in road level will not actuate the motor 13 for driving the pump and only road inequalities of a predetermined amount or degree will be effective to make a complete stroke of the charging pump.

The pipe 8 is connected by a coupling 12 to the stud 15 which is mounted upon the head member 16, this head member having a threaded flange 17 for embracing the threaded chamber member 18 which constitutes a part of the frame casting 19 of the unit 4.

A diaphragm 20 has its margins gripped between the head member 16 and the chamber member 18. These members 16 and 18 have central depressions for providing the diaphragm chamber. The diaphragm has a pumping plunger 22 connected thereto, through the intermediary of the stem member 23, this stem member comprising a cylindrical piece of metal having a reduced stud 24 extending through the center of the diaphragm 20 and having the end of the stud 24 riveted over a washer which forms a diaphragm plate for the right-hand side of the diaphragm 20. The stem member 23 has a recess milled sidewise into the same to receive the flanged head member 25 which flanged head member is secured upon the rear end of the pump plunger 22. The head member 25 and the diaphragm stem member 23 are thus separable, but when the parts are assembled the guiding of the plunger 22 in the cylinder bore which is formed in the frame casting 19 prevent disengagement of these parts so that the plunger 22 moves with movement of the diaphragm 20.

The frame casting 19 has a suitable horizontal bore 26 which is formed in three sections, first the cylinder bore 27 for the plunger 22, next a larger counterbore 28 for receiving the discharge check valve spring 29 and the ball discharge check valve 30 which seats upon a seat at the junction of the counterbore 28 and the cylinder bore 27.

The third division of the bore 26 comprises another counterbore 32 and it receives a compression spring 33 for the second discharge check valve 34, which is seated at a seat between the counterbores 28 and 32.

The outer end of the bore 32 is closed by a screw plug 35. The discharge check valve chamber which is formed by the bore 26 to the left of the second check valve 34 communicates by way of a passageway 37 with the interior of the pressure accumulator 38. This pressure accumulator 38 comprises a vertical tube 39 which has its lower margin flanged inwardly and has a threaded portion immediately above the same, threaded into a socket 40 in the frame member 19. A gasket 42 is disposed in the bottom of the socket and this gasket is engaged by the lower end of the tube 39 to form a fluid-tight joint.

Within the tube 39 there is disposed a plunger 43 backed by a compression spring 44. The compression spring at its upper end engages the cap member 45 which is provided with a lower threaded margin 46 engaging threads on the upper end of the tube 39 for suitably compressing the spring 44 within the tube 39 when the parts are assembled. The cap 45 has an atmospheric opening 47 at the upper end thereof.

The plunger or piston 43 of the accumulator is built up of a cup leather 48, the central part of which is clamped between the bottom wall 49 of a cup shaped guiding member, preferably made of sheet metal and guided fairly closely within the tube 39 to give the plunger a fairly long guiding bearing to prevent cocking or tilting of the cup leather in the bore of the tube 39.

The bottom side of the central part of the cup leather 48 is engaged by a sheet metal guide and threading member made up of two parts, the first of which is a downwardly facing cup member 52 and the second of which is a telescoping cup member 53 providing a guiding edge just below the flange of the cup leather 48 and providing an internal form for the cup leather to hold it substantially in working position. These two cup members 52 and 53 are preferably sealed or otherwise secured together to prevent their becoming disengaged and they serve also to decrease the clearance space in the accumulator 38.

The bore 27 of the charging pump has an overrun inlet port 55 which communicates with a passageway 56 leading at its upper end to the interior of the supply reservoir 57. This supply reservoir 57 is formed of a piece of tubing 58 having its lower edge flanged diagonally inwardly to engage a gasket 59 formed at the bottom of a threaded socket 60 into which the lower threaded end of the tube 58 is secured.

The upper end of the tube 58 has an integral head 62, the central part of which is provided with a downwardly extending flange 63 for receiving the threaded plug 64 which closes the upper end of the reservoir 57. A breather opening 64 permits atmospheric pressure to prevail within the reservoir 57 and this breather opening is covered by a hood 65, the central part of which hood is gripped under the plug 64 and the outer portions of which hood extend clear of the upper ends of the walls of the reservoir 57.

The portion of the diaphragm chamber which is on the right-hand side of the diaphragm 20 communicates through the passageway 66 with the interior of the reservoir 57 so that liquid may move into and out of the diaphragm chamber with motion of the diaphragm 20.

From the operation of the parts thus far described it may be seen that movement of the shock absorber member 5 results in changes in pressure in the pipe 8 above and below atmospheric pressure with the result that the diaphragm 20 moves to and fro under such variations of pressure. Upon an outward stroke of the diaphragm 20 the pump plunger 22 is carried to the right as viewed in Figure 4, uncovering the overrunning port 55 and permitting liquid from the reservoir 57 to enter the cylinder bore 27. Upon movement of the piston 27 to the left by pressure acting upon the diaphragm 20, the small volume of oil trapped between the end of the plunger after it runs past the port 55 and the first check valve 30, is discharged past that check valve into the counterbore 28 with the corresponding displacement of liquid past the check valve 34 through the passageway 37 and into the pressure accumulator 38. Continued operation of the charging pump will thus transfer liquid from the reservoir 57 into the accumulator 38 raising the plunger 43 against the strength of the spring 44.

The selectivity of the device to road irregularities of different sizes may be further controlled by inserting a resistance plug element, such as that shown at 67 in Figure 8, between the diaphragm chamber and the shock absorber as by disposing the same within the stud 15. The resistance to flow presented by the tube 8 may of itself be sufficient to provide the desired selectivity so that the charging pump will not charge the accumulator 38 too rapidly.

In order to deliver the pressure from the accumulator 38 to the lubricating pump, a fluid delivery pipe 68 is provided. This pipe is connected by a T 69 to two branches 72 and 73 respectively leading to the light oil unit 2 and grease unit 3 respectively.

Pressure release valve mechanism

To control the application of pressure from the accumulator 38 to the pumps of the units 2 and 3, I provide a pressure controlled valve 70 between the accumulator and the delivery pipe 68. This valve 70 is built into the cylinder frame 19 of the unit 4 as follows. A branch passageway 74 extends from the counterbore 32 which counterbore communicates by way of the passageway 37 with the accumulator 38. This passageway 74 leads into a valve chamber formed in the cylinder frame and terminates in a yielding valve seat 75 disposed in the bottom of said valve chamber.

A disk valve 76 comprising a round disk of sheet metal with a central depression to form the valve member co-operating with the yielding valve seat 75 is disposed within the valve chamber and is pressed against the valve seat by means of a suitable compression spring 77, which spring is seated in the spring seat formed in the plug member 78 threaded into a socket in the frame member and closing the valve chamber. The valve chamber communicates by way of a passageway 79 extending horizontally in the frame member to a vertical passageway 80 terminating in a recess or threaded socket formed in the frame member within the oil reservoir 57. Into this threaded socket 82, I secure a resistance plug unit 83 which comprises an outer tubular shell 84 the lower end of which is threaded into the threaded socket 82 and the upper end of which shell receives the resistance plug 86. This plug 86 fits the bore of the tube 84 to form a tight seal, but it has a helical groove 87 forming an open resistance passageway to permit the oil under pressure to escape back into the reservoir 57 when the pressure controlled valve 76 is opened.

The screen 88 of fine mesh is disposed between the port 80 and a projection on the lower end of the resistance plug 86. Its purpose is to screen out impurities and prevent such impurities from becoming lodged in the resistance passageway 87.

The plug member 78 which closes the one side of the valve housing has a yielding face formed of a ring 89 against which the margins of the valve disk 76 are adapted to press when the internal pressure in the accumulator exceeds the pressure at which the resistance of the spring 77 is overcome.

Preferably, but not necessarily, I connect the spring pocket in the plug 78 with the interior of the reservoir 57 to provide a pressure differential control. That is to say, when the pressure in the accumulator 38 rises to a value which is great enough to force the valve disk 76 away from the yielding seat 75 acting through the reduced opening 74, it is desirable that the valve 76 after it is once opened be allowed to remain open until the pressure drops to a definite value, which would correspond to the making of a stroke by the lubricating pumps of the units 2 and 3. By permitting the pressure of the accumulator to act upon the entire front area of the valve disk 76 to overcome the spring 77 and permitting only atmospheric pressure to act upon the back of the same in addition to the spring 77, it can be seen that a definite reduction in pressure from the accumulator be required before the valve 76 again snaps to its seat to close.

I have not shown this passageway in the drawings, but it will be readily understood that the same may be accomplished by radial drillings of the plug 78 and a drilling extending through the frame member to the reservoir 57.

Since the making of a stroke of the lubricant dispensing pumps of the units 2 and 3 must be made at a pressure which is in excess of that at which the valve disk 76 will be permitted to snap back on to the yielding seat 75, it is desirable that some blow-down port or other means be provided for permitting the pressure to drop down to a value where the valve disk 76 may again close the port 74. To this end I have provided the resistance plug 83 which has previously been described and which communicates at all times with the pressure delivery pipe 68. The pressure delivery pipe 68 is connected through a suitable compression coupling 89 formed in a boss 90 on the frame casting 19. The upper end of the tube 68 communicates through a passageway 92 to the interior of the pressure release valve housing.

The frame casting 19 has a foot pedestal 93 by which the same is mounted upon the dashboard by suitable screws or bolts.

The operation of the pressure control valve and its blow-down resistance plug are as follows. Assume that the charging pump has charged the accumulator 38 with liquid to a predetermined pressure which pressure is great enough to force the valve disk 76 away from its seat and back on to the seat 89 against atmospheric pressure which prevails on the back of the same or such other pressure as may there be maintained.

Immediately the pressure of the accumulator 38 is transmitted by way of the pipe 68 to the motor chambers of the pump of the units 2 and 3, to be described later, causing the pistons thereof to make a stroke. At the same time the pressure begins to act upon the resistance plug 83, shown in Figures 4 and 6, permitting liquid to leak through the resistance passage back into the reservoir 57. This leakage of pressure progresses until the pressure has been depleted to a point where the pressure upon the back side of the valve disk 76 acting with the pressure of the spring 77 is great enough to overcome the fluid pressure upon the face area of the valve member 76 causing it to snap shut, whereupon continuous operation of the charging pump will again charge the accumulator to the pressure required for snapping the valve 76 open.

When the valve 76 has snapped shut, that is to the position shown in Figures 5 and 7, the pressure of oil in the pipe 68 and in the connected motor chambers may be evacuated in either one of two ways or both, viz. back through the passageway from the spring seat 77 into the chamber 57, which return passageway is opened by the valve disk 76 snapping back to the yielding seat 75, as above described; or if such return passageway is not provided on the back side of the valve 76, this pressure which is contained in the pipe 68 and connected space is forced through the resistance passageway of plug 83 back into the reservoir 57.

As it takes an appreciable interval of time for the liquid under pressure to escape through the resistance passageway, the strokes of the pumps of units 2 and 3 will be completed before any appreciable depletion of pressure occurs.

*Reservoir and pump unit for grease*

The reservoir and pump unit for grease is shown in section in Figure 11. It comprises a frame member 94 having a foot or pedestal 95 by which the frame member may be secured to the dashboard 1. On the bottom side of the frame casting 94 there is provided a shallow circular socket with a surrounding flange 96. In the bottom of the socket there is disposed a gasket 97, against which the upper end of the glass reservoir 98 bears and makes a substantially fluid-tight joint.

The glass reservoir 98 is formed with cylindrical walls through the major portion of its length terminating in a rounded bottom portion 99 and the hollow boss 100 at the bottom. A suction tube 102 is threaded into a socket 103 in the bottom of the frame member 94 and extends down through the opening in the boss 100.

A wing nut member 104 is threaded on the lower end of the suction tube 102.

This wing nut bears a yielding gasket 105 at its upper face to engage with the hollow boss 100, the gasket 105 being surrounded by an integral metal flange. The central part of the boss 100 is coned or flared out so that the yielding gasket 105, as it is forced upwardly, tends to grip the side walls of the pipe 102 to form a tight joint independently of the threads, which connect with the wing nut 104. The wing nut 104 is recessed to provide a valve chamber 113. The lower end of the recess is adapted to receive a ring 107 with a conical opening 108 for engaging a spout or nozzle of a filling can for filling the reservoir 98 with grease. The ring 107 has a valve port 109 closed by a disk-like valve 110 which has arms 112 extending upwardly and guided within the recess and engaged by compression spring 106. The disk valve 110 bears against the yielding gasket seat 114 carried in a recess in the ring member 107.

The suction tube 102 has one or more openings 115 through the side walls thereof. A pair of sheet metal ring-like members provide a pair of valve seats at 116 and 117. The inner ring-like member is necked down to embrace the pipe 102 above the opening 115 and is preferably soldered in place or otherwise thus secured to the wall of the pipe 102.

The outer ring-like member is likewise necked down to embrace the wall of the pipe 102 below the opening 115 and is secured in place by soldering or otherwise. The upper edges or beads 116 and 117 preferably lie in a common plane at substantially right angles to the axis of the pipe 102. Thus an annular valve opening or port is formed between the beads 116 and 117 and this valve port is controlled by a thin flexible annular valve disk 118 carried in a cage 119 formed of an upper sheet-metal part 120 flanged at the center, as indicated at 122, to be guided upon the pipe 102. The lower part of the cage 119 is formed of a sheet-metal ring 123 having a flange lying flat against the margins of the disk 120 and having an inwardly extending flange forming a shelf upon which the outer margin of the yielding, annular valve disk 118 rests.

A housing 124 for the valve cage is formed of a cylindrical sheet-metal member having an upper flange 125 turned inwardly to overlie the outer margin of the valve cage 119. At its lower end the cylindrical member 124 has an inwardly extending disk-like portion which has a number of openings 126 to permit grease to flow freely therethrough and has an axially extending flange 127 which embraces the outer ring-like member which forms the outer bead 117. The housing member 124 is soldered to the outer ring-like member and a light compression spring 128 in the housing 124 tends at all times to raise the valve cage 119 to keep the valve disk 118 away from the valve port between the beads 116 and 117.

The upper sheet-metal member 120 is provided with a series of depressions so as to keep the valve disk 118 from sticking to the surface thereof. It can now be seen that if the disk-like valve 118 is forced away from its seat and lubricant forced into the lower end of the tube 102, it can pass freely through the annular valve port into the housing 124 down through the opening 126 and into the reservoir 98. Likewise it can be seen that suction put upon the upper end of the tube 102 will tend to draw grease from the reservoir 98 through the opening 126, the annular valve port openings 115 and tube 102. The spring 106 of the valve disk 110 is made purposely powerful both to prevent the leakage of oil or grease out of the reservoir and also to prevent suction from opening the same.

A grease follower 130 provided with a guiding sleeve 132 is adapted to be drawn downwardly as the contents of the reservoir 98 are withdrawn. As the contents are withdrawn, the grease follower is lowered and the sleeve member 132 engages the valve cage 119, lowering the disk valve 118 on to the double bead valve seat, closing off the annular port and preventing suction from withdrawing any further grease from the reservoir 98. The annular valve disk 118 may be made of Empire cloth, or like material, for securing a tight seal of the double bead valve.

The grease follower 130 is formed of two perforated disks of sheet metal, the inner margins of the disks being offset toward each other and clamped between flanges or beads formed on the guiding tube 132, to secure a firm union between the guiding tube and the disks 133 and 134. Between the outer margins of the disks 133 and 134, a cup leather or flanged washer 135 is secured, as by means of suitable rivets. The upper disk 133 is provided with an opening 136 of relatively small diameter and the lower disk 134 is provided with an opening 137 of relatively large diameter and a tongue member 138 integral with the cup leather 135 extends over the opening 136, but is of a size which permits it to lie within the opening 137. The purpose of this valve is to prevent excessive pressure being placed on the top of the grease follower. Normally, the follower lies flat upon the upper surface of the grease and the valve tongue 138 is held shut by engagement with the grease, but in the event that the valve 118 should leak and excessive pressure were applied to the upper surface of the follower 130, it might be injured or bent, but the valve 138 prevents the same.

The frame member 94 has an integral pump cylinder 139 and valve chamber 140. Likewise, a motor cylinder 142 is cast integral with the parts 140 and 139. The upper end of the tube 102 communicates by way of a passageway 143 with the interior of the valve chamber 140. An intake valve member 144 having a stem 147 is adapted to seat upon a gasket 146 set in a recess about the valve port. A spring 145 normally holds the valve member in this position.

The stem 147 is provided with a head 148 which head projects into a recess formed in the screw plug 149 threaded into the outer end of the cross bore 150, which forms the intake valve chamber.

In a similar manner, the pump cylinder 139 has a discharge valve comprising a ball valve 152 seating upon a ring or valve seat 153 set in a recess in the cross bore 154, the outer end of which is closed by the plug 156 and has a pocket for the spring 155, which holds the discharge check valve 152 to its seat.

The cross bore 154 communicates with the discharge pipe 157, which is secured in the boss 158 by a compression coupling 159 of a type heretofore disclosed by me in an application filed October 4, 1929, and bearing Serial No. 397,337.

The motor cylinder 142 has an integral boss 160 to which the pressure pipe 73 is connected by a compression coupling 162. A recess 163 is formed between the motor cylinder and the pump cylinder for receiving the compression spring 164 for moving the pump and motor plunger to make a suction stroke of the pump and the return stroke of the motor. The outer end of the motor cylinder 142 is closed by a cylinder head 165 which has a flange 166 bearing upon a ring gasket 167, closing the outer end of the motor cylinder.

The plunger comprises a pair of piston members, viz. the pumping piston 168 and the motor piston 169. The pumping piston 168 is built up of two cup leathers 170 and 172 faced in opposite directions.

A screw bolt 173 having a head 174 disposed within the cup 170 extends through both cup leathers and through a spacing washer 175.

A metal washer 176 is disposed between the cup leathers 170 and 172 and serves to give rigidity thereto. The motor piston 169 comprises a cup leather 177 of a size suitable to fill the motor cylinder. This cup leather 177 is backed up by a plate or washer 178 formed of metal and engaging the collar 175. Upon the opposite side of the cup leather 177, a clamping nut 179 is threaded upon the end of the bolt 173. The nut 179 is adapted to enter a recess formed in the cylinder head 165. The boss in the cylinder head 165 which receives the nut 179 may be formed of hexagon or octagon formation to receive a suitable wrench.

The pressure pipe 73 communicates through a passageway 180 with the clearance space between the motor piston and the head 165 to admit pressure fluid for driving the plunger to the left.

The space between the two cylinders is open to atmosphere by means of a vent 182.

The operation of the grease pump is as follows. When pressure fluid is admitted to the motor cylinder, the plunger is driven to the left, the pump piston discharging the contents of the cylinder 139 past the discharge check valve 152 and delivering the same to the pipe 157 to the T 183.

From the T one branch 184 leads to the resistance unit 185—185 of the bearings 186—186 adapted to be supplied with grease. The other side of the T communicates by way of a delivery pipe 187 with the resistance unit 188—188 leading to bearings 189—189 adapted to be lubricated by the use of grease. A vent member 190 through the top wall of the frame member 94 permits atmospheric communication with the interior of the reservoir 98 above the grease follower 130.

The type of resistance unit and the type of distribution pipe is not of the essence of the present invention. The delivery pipe system is of the closed type and the bearings which are to be lubricated may be of any suitable type, although grease is particularly useful in connection with the lubrication of bearings having cavities formed in conjunction therewith or forming a part of the same.

In Figure 12, I have shown a suitable form of resistance unit which may be applied in connection with the pipe-line system. This unit comprises a T-shaped body 190' having a vertical longitudinal bore and a cross bore. The cross bore extends through the longitudinal bore and the arms 192 and 193 form sockets for receiving ends of tubing forming the pipe-line system, as indicated at 194 and 195. The sockets 192 and 193 are shrunk as by swaging or the like upon the ends of the tubes 194 and 195 to form tight unions with the same.

Instead of such swaging operation, the tubes 194 and 195 might be soldered in the socket or otherwise connected. The lower end of the shank or body portion 196 has an outwardly extending flange 197 adapted to form a shoulder against which the threaded coupling sleeve 198 bears at its lower end, this coupling sleeve 198 being threaded into a straight threaded socket 199, forming a part of the frame 200 of the bearing. The lower flanged end 197 of the body portion is forced tight against the gasket 202 disposed in the bottom of the threaded socket. A passageway 203 communicates with the inside of the bearings between the shaft or pin 204 and its bushing 205. The upper end of the longitudinal bore is closed by a screw plug 206 having a suitable head adapted to be engaged by a wrench or the like. A resistance plug unit 207 which fits quite closely the interior of the body portion 196 is connected to the plug 206 by a part of reduced section 208, providing both a passageway around it and imparting a flexibility to the connection. The plug member 207 has a helical groove 209 formed upon the outside of the same providing a resistance passageway for grease. The passageway 209 is preferably large enough to pass any impurities or particles contained in the grease and yet afford sufficient resistance to flow to provide substantially uniform pressure and flow distribution throughout the pipe-line system.

Obviously the particular form of unit here shown is not essential to the operation of the system, but I have found the same highly useful. Instead of employing a coupling screw 198, as shown, the shank 196 may be made a straight cylindrical member and have a drive fit with the bearing socket. The pipe-line system is made up in preformed and preassembled units of greater or less extent which may then readily be applied to the automobile, as by means of the coupling screws 198, or by the drive fit above mentioned. The units 185 are shown at the right of Figure 1 to be of the same construction as shown in Figure 12, whereas the units 188 at the left are formed by soldering the tubes into the sockets and may have any suitable interior construction for securing equal emissions at the various bearings where equal emissions are desired.

*Light oil unit*

In Figure 13, I have shown the oil reservoir and pump unit 2 in section. The structure of the unit 2 is substantially identical with the structure of the unit 3 with the following exceptions. First, that a grease follower is not employed, for since the liquid contained in the reservoir 98 will maintain its own level, no follower is required.

Next, instead of using the follower to close the annular valve port by lowering the valve 118 upon the double bead valve seat, I employ in the unit 2 a float 210. This float may comprise a cork body of annular shape embracing the suction tube 102 and having guiding plates 212 and 213, guiding the float upon the tube 102. The lower guiding plate 213 corresponds to the plate 119 of the cage shown in Figure 11 and forms with the companion member 123 the valve cage for carrying the disk valve 118. The upward motion of the float 210 is limited by a split spring ring 214 set into a groove cut in the surface of the tube 102.

The delivery pipe 215 connects with a T 216 and from the T 216 branches 217 and 218 lead off to the metering units 219—219 and 220—220 respectively.

The reservoir of the unit 2 is provided with a breather 190 to permit air to enter or leave the inside of the reservoir and the unit 2 is provided with a filler opening normally covered by a cap member 224 closing the opening but permitting oil to be poured into the reservoir when desired. I have shown the filler opening covered by the cap 224 as being placed on the side where it will be convenient for filling.

The metering units such as 219 and 220 may be of any preferred form embodying the necessary means for performing the two required functions, viz. of metering out the required charge of lubricant and of preventing the entry of air into the pipe-line system, which entry of air at a higher unit would tend to drain oil out of a lower unit.

A metering unit employing a resistance plug and a check valve of known type, or a metering unit of the type shown in Figure 25 of my copending application No. 394,363 may be employed, or the novel form of metering unit devised by me and shown in Figure 14 may be employed. This unit comprises a cross shaped body 225 having a vertical longitudinal bore and a transverse bore, the transverse bore having counterbores providing sockets for the tubes 226 and 227 forming part of the pipe-line system. The tubes may be soldered in the sockets or secured therein by pinching or swaging the bosses in which the sockets are formed upon the tubes adjacent therein, as was shown in Figure 12.

The lower end of the body comprises a shank 228 of cylindrical exterior configuration. This shank is driven into a corresponding socket 229 forming a part of the bearing frame. The lower end of the body 225 has a bore 230 in which there is fitted a resilient plug 232 which plug may be formed of cork or the like, having a relatively close fit in the bore 230, at least sufficiently close to shut off the passage of air or oil under normal conditions, that is when no pressure above the hydrostatic head of the liquid in the pipe-line system is applied thereto.

The plug 232 extends above the bore 230 into a counterbore 233 which counterbore continues on upward through the rest of the unit. The upper end of the counterbore is threaded as at 234 to receive the threaded plug 235 which closes the upper end of the bore. The resilient plug 232 is secured to the screw plug 235 so that the two may be removed or inserted together, by means of a headed pin 236, the head being disposed at the lower end of the plug 232 and the upper end of the pin being driven into the socket formed in the threaded plug 235 as indicated at 237. A spacing collar 238 and a screen 239 formed in the shape of an upwardly opening cup or basket embrace the shank of the pin 236 and are secured in place suitably spacing the parts in the desired positions.

In operation, the plug 232 which is ground to size, normally shuts off completely the bore 230 so that neither oil nor air can pass the same. However, when oil under pressure is applied to the upper end of the plug 232 the pressure upon the sides of the same tends to compress the plug and the oil begins to force its way down along the sides of the plug 232 until it passes the plug and is discharged through the opening 240 into the bearing. As soon as the pressure is relieved, the plug expands and fills the bore shutting off by the passage of air or liquid.

The head of the screw plug 235 forms a suitable driving space for driving the shank 228 into the socket 229. The screw plug 235 together with the screen 239 and the resilient plug 232 may be removed as a unit for cleaning or for repairs. The plug 232 may have peripheral rings or may be relieved along a part of its peripheral surface, if desired. The theory of operation of the plug 232 is that it will be compressed by the side pressure to provide a suitable passageway for the oil under pressure to permit oil under pressure to pass, but to cut off passage of any fluid at less pressure. By this construction, equal emissions, where equal emission is desired, may readily be secured.

*Operation*

The operation of the system as a whole will now be briefly reviewed. The desire in this lubricating system is to perform a lubricating operation of distribution of a lubricant, or of several lubricants, periodically depending upon the extent of use of the machine to be lubricated.

It is old of course to have reduction gears which would measure the road travel of the vehicle from the propeller shaft or a similar movable member, and to perform an operation for every fifty miles of road travel or some such measured amount of road travel, but the movement of a part designed to discharge a small quantity of lubricant every fifty miles of road travel, would be so slow that it would not be reliable.

I desire a swift and positive movement at stated intervals which correspond to the predetermined amount of use or road travel, or the like. For this purpose, I determine the amount of road travel, not altogether by absolute distance but rather by the extent of vibration of the axle relative to the frame, or some such similar phenomenon, indicating for at least certain parts of the chassis, more accurately the degree of use than would an absolute measure of road travel.

However, I find that on the average, the major inequalities of the road are practically the same for most types of road construction.

The minor inequalities of one type of road may be much greater than the minor inequalities of another type of road and for this reason, as I have indicated previously, I make the charging pump responsive not to short and sharp fluctuations of pressure in the shock absorber but only to fluctuations of long enough frequency or persistency to exclude all minor inequalities. By employing as a measure of use the vibration of frame in respect to axle, or vice versa, I may use the hydraulic shock absorber, or an inertia type of pump for providing the necessary impulses of fluid pressure, preferably hydraulic pressure for operating the diaphragm 20 of the charging pump.

The charging pump makes a very large number of pumping strokes to charge the accumulator 38 with liquid and when the pressure in the accumulator has reached a predetermined value the pressure release valve 70 opens a passageway from the accumulator to the motors of the units 2 and 3 causing them to make discharge strokes. At the same time, the pipe 68 which leads to the motors of the units 2 and 3 is put into communication with the bleeder or resistance plug 83, which bleeds down the pressure in the discharge line 68 to a value where the pressure release valve 70 closes and the remaining pressure fluid is discharged back into the reservoir 57, the springs in the motors of the units 2 and 3 making the return stroke of the plungers and drawing lubricant from the grease reservoir and light oil reservoir respectively into the cylinders of the pump to be ready for the succeeding discharge stroke.

Upon each discharge of pressure from the accumulator 38 to the motors of the units 2 and 3, strokes are made for discharging predetermined amounts of lubricant into the pipe-line systems and these predetermined amounts of discharged lubricant are distributed among the bearings by the metering units to provide equal emission where equal emission is desired. Obviously, instead of having two units 2 and 3, a single unit may be employed, or more than two units may be employed for proper lubrication of the bearings of the machine to be lubricated.

It will be apparent from the foregoing that I have provided a closed hydraulic system for reducing a large number of motions to a single positive motion to be performed periodically or at the end of a predetermined number of primary motions. It will be observed that the flexibility of the system is highly advantageous, since predetermined displacements of lubricant are made by the lubricant pump regardless of the amount of lubricant charged into the accumulator 38 by the charging pump. That is to say, the actual volume displaced by the charging pump may be more or less than that actually displaced by the plungers, since it is within the scope of my invention to have the motor plunger of a smaller, as well as of a larger diameter than the pump plunger in the lubricants pumps of the units 2 and 3. Also the amount of lubricant charged by the charging pump into the accumulator 38 may be in excess of the actual displacement of the motor pistons of the lubricant pumps, since the excess, after the valve 70 is opened, is merely returned to the reservoir 57.

I do not intend to be limited to the details as shown and described.

I claim:

1. In combination centralized lubricant supply means, a distribution system for distributing lubricant to bearings to be lubricated, a pump between the lubricant supply means and the distributing system, a hydraulic motor for operating the pump, a hydraulic pressure system for supplying hydraulic pressure to said motor and a valve automatically controlling the application of hydraulic pressure of said system to said motor.

2. In combination centralized lubricant supply means, a distribution system for distributing lubricant to bearings to be lubricated, a pump between the supply means and the system, hydraulic pressure means for operating said pump, comprising a hydraulic pressure accumulator and a charging pump for charging said accumulator with liquid.

3. In combination centralized lubricant supply means, a distribution system for distributing lubricant to bearings to be lubricated, a motor, a pump between the supply means and the system, hydraulic pressure supply means, comprising a hydraulic pressure accumulator and a charging pump for charging said accumulator with liquid and means for intermittently applying the hydraulic pressure to said motor for the operation thereof.

4. The combination with a machine having relatively movable parts of a fluid pulsator operated by movement of said parts, a motor member responsive to pulsations of said fluid pulsator, a pump actuated by said motor member, a reservoir for supplying liquid to said pump, an accumulator adapted to be charged with liquid under pressure by said pump, and a second motor member adapted to be actuated by pressure from said accumulator.

5. The combination with a machine having relatively movable parts of a fluid pulsator operated by movement of said parts, a motor member responsive to pulsations of said fluid pulsator, a pump actuated by said motor member, a reservoir for supplying liquid to said pump, an accumulator adapted to be charged with liquid under pressure by said pump, a second motor member adapted to be actuated by pressure from said accumulator, and a valve for controlling the application of the accumulated pressure to said second motor member.

6. The combination with a machine having relatively movable parts of a fluid pulsator operated by movement of said parts, a motor member responsive to pulsations of said fluid pulsator, a pump actuated by said motor member, a reservoir for supplying liquid to said pump, an accumulator adapted to be charged with liquid under pressure by said pump, a second motor member adapted to be actuated by pressure from said accumulator; and a valve for controlling the application of the accumulated pressure to said second motor member, and means for returning the operating liquid to said reservoir upon the completion of a stroke of said second motor member.

7. The combination with a machine having relatively movable parts of a fluid pulsator operated by movement of said parts, a motor member responsive to pulsations of fluid pressure of said pulsator, a pump actuated by said motor member, a reservoir for supplying liquid to said pump, an accumulator adapted to be charged with liquid under pressure by said pump, a second motor member adapted to be actuated by hydraulic pressure from said accumulator, a control valve governing the connection of the accumulator to said second motor member, and a return passageway between said second motor member and the reservoir.

8. The combination with a machine having relatively movable parts of a fluid pulsator operated by movement of said parts, a motor member responsive to pulsations of fluid pressure of said pulsator, a pump actuated by said motor member, a reservoir for supplying liquid to said pump, an accumulator adapted to be charged with liquid under pressure by said pump, a second motor member adapted to be actuated by hydraulic pressure from said accumulator, a control valve governing the connection of the accumulator to said second motor member, and a return passageway between said second motor member and the reservoir, and means in said last named passageway governing the return of liquid from the motor members to the reservoir.

9. In combination a hydraulic pump a reservoir for supplying liquid thereto, an accumulator adapted to be charged with hydraulic pressure from said pump, a motor member, a passageway from the accumulator to the motor member, a pressure release valve for controlling said passageway, said valve being constructed and arranged to be opened upon a predetermined pressure in said accumulator and thereupon permit flow of liquid to said motor member for operating the latter, a return passageway for liquid from the motor member to the reservoir, and a flow controlling resistance member in said last named passageway.

10. In combination a hydraulic pump, a reservoir for supplying liquid thereto, an accumulator adapted to be charged with hydraulic pressure from said pump, a motor member having a spring pressed piston, a pressure release valve between the accumulator and the motor member, said valve being constructed and arranged to be opened upon a predetermined pressure in said accumulator and thereupon permit flow of liquid to said motor member for operating the latter, and means between the motor member and the reservoir for bleeding down the hydraulic pressure in the motor member.

11. The combination with an automobile having relatively movable frame and axle members, of a fluid pulsator operated by movement of said parts, a motor member responsive to pulsations of fluid pressure of said pulsator, a hydraulic pump actuated by said motor member, a reservoir for supplying liquid to said pump, an accumulator adapted to be charged with liquid under pressure by said pump, a second motor member adapted to be actuated by pressure from said accumulator, a centralized lubricating pump connected to said second motor member and adapted to be actuated thereby, and means for applying the accumulated pressure in said accumulator to said second motor member.

12. In combination an accumulating chamber member, a reservoir chamber member, a frame member forming one wall of the accumulating chamber and one wall of the reservoir chamber, there being a bore through said frame member and there being connecting passageways from the accumulating chamber and from the reservoir chamber to said bore, one end of the bore forming a pump cylinder.

13. In combination an accumulating chamber member, a reservoir chamber member, a frame member forming one wall of the accumulating chamber and one wall of the reservoir chamber, there being a bore through said frame member and there being connecting passageways from the accumulating chamber and from the reservoir chamber to said bore, one end of the bore forming a pump cylinder, and a pump piston in said pump cylinder overrunning one of said connecting passageways.

14. In combination an accumulating chamber member, a reservoir chamber member, a frame member forming one wall of the accumulating chamber and one wall of the reservoir chamber, there being a bore through said frame member and there being connecting passageways from the accumulating chamber and from the reservoir chamber to said bore, one end of the bore forming a pump cylinder, and a discharge check valve in said bore between said communicating passageways.

15. In combination an accumulating chamber member, a reservoir chamber member, a frame member forming one wall of the accumulating chamber and one wall of the reservoir chamber, there being a bore through said frame member and there being connecting passageways from the accumulating chamber and from the reservoir chamber to said bore, one end of the bore forming a pump cylinder, and one end of the frame member adjacent the pump cylinder forming a diaphragm chamber.

16. In combination an accumulating chamber member, a reservoir chamber member, a frame member forming one wall of the accumulating chamber and one wall of the reservoir chamber, there being a bore through said frame member and there being connecting passageways from the accumulating chamber and from the reservoir chamber to said bore, one end of the bore forming a pump cylinder, a diaphragm chamber, a diaphragm for said diaphragm chamber and a head member for the diaphragm chamber secured to the adjacent end of the frame member.

17. In combination an accumulating chamber member, a reservoir chamber member, a frame member forming one wall of the accumulating chamber and one wall of the reservoir chamber, there being a bore through said frame member and their being connecting passageways from the accumulating chamber and from the reservoir chamber to said bore, one end of the bore forming a pump cylinder, a diaphragm chamber, a diaphragm for said diaphragm chamber and a head member for the diaphragm chamber secured to the adjacent end of the frame member, and a pressure release valve disposed in a recess in the frame member, said pressure release valve having communication with the accumulating chamber.

18. In combination an accumulator comprising an accumulator member, a reservoir comprising a reservoir member, a frame member having a bore with a lateral passageway leading to the accumulator and a lateral passageway leading to the reservoir, a pressure release valve having a housing communicating with said accumulator, a delivery pipe leading from the said valve, and a piston in one end of said bore adapted to pump liquid from the reservoir to the accumulator.

19. In combination an accumulator comprising an accumulator member, a reservoir comprising a reservoir member, a frame member having a bore with a lateral passageway leading to the accumulator and a lateral passageway leading to the reservoir, a pressure release valve having a housing communicating with said accumulator, a delivery pipe leading from the said valve, and a piston in one end of said bore adapted to pump liquid from the reservoir to the accumulator, and a return passageway from the valve housing to the reservoir.

20. In combination an accumulator comprising an accumulator member, a reservoir comprising a reservoir member, a frame member having a bore with a lateral passageway leading to the accumulator and a lateral passageway leading to the reservoir, a pressure release valve having a housing communicating with said accumulator, a delivery pipe leading from the said valve, and a piston in one end of said bore adapted to pump liquid from the reservoir to the accumulator, a motor member carried by the frame member having a diaphragm connected to said piston for operating the same.

21. In combination a reservoir, an accumulator, a pump between the reservoir and the accumulator, a pressure release valve communicating with the accumulator, a delivery pipe adapted to be placed in communication with the accumulator by opening of the valve and bleeder mechanism for bleeding pressure from said delivery pipe back to the reservoir.

22. In combination a reservoir, an accumulator, a pump between the reservoir and the accumulator, a pressure release valve communicating with the accumulator, a delivery pipe adapted to be placed in communication with the accumulator by opening of the valve and bleeder mechanism for bleeding pressure from said delivery pipe back to the reservoir, said bleeder comprising a flow resistance member.

23. In combination a frame member comprising a pumping cylinder and a chamber, a diaphragm in said chamber, a piston connected to said diaphragm, this piston being disposed in said cylinder, a reservoir unit mounted on a frame member and communicating with said pumping cylinder, a discharge valve for the pumping cylinder, an accumulator member mounted on the frame member, and connected with the delivery side of said valve, a pressure release valve having a housing in said frame member and having a delivery pipe connected thereto and means providing communication between said valve housing and said reservoir comprising a passageway extending through the frame member.

24. In combination with a machine having relatively movable members and having bearings to be lubricated, a pressure accumulating system, pump means for forcing lubricant to said bearings operable by the pressure in said system, means operable upon relative movement of said members for accumulating pressure in said system, and means for damping the effect of the relative movement of said relatively movable members upon said pressure accumulating system.

25. In combination with a machine having relatively movable members and having bearings to be lubricated, a pressure accumulating system, pump means for forcing lubricant to said bearings, pressure releasing means for relieving the pressure of said system to operate said pump, means operable upon relative movement of said members for accumulating pressure in said system, and means for damping the effect of the relative movement of said relatively movable members upon said pressure accumulating system.

26. In combination with a machine having relatively movable members and having bearings to be lubricated, a pressure accumulating system, pump means for forcing lubricant to said bearings, spring loaded motor means operable by the pressure in said system, pressure releasing means for relieving the pressure from said system to operate said motor means, and means for damping the effect of the relative movement of said relatively movable members upon said pressure accumulating system.

OSCAR U. ZERK.